United States Patent [19]

Allina

[11] Patent Number: 4,907,119
[45] Date of Patent: Mar. 6, 1990

[54] PACKAGED ELECTRICAL TRANSIENT SURGE PROTECTION

[76] Inventor: Edward F. Allina, 605 Capri Blvd., Treasure Island, Fla. 33706

[21] Appl. No.: 286,446

[22] Filed: Dec. 20, 1988

Related U.S. Application Data

[63] Continuation-in-part of Ser. No. 923,524, Oct. 28, 1986, and a continuation-in-part of Ser. No. 123,419, Jan. 12, 1988, and a continuation-in-part of Ser. No. 185,584, Apr. 22, 1988, and a continuation-in-part of Ser. No. 185,587, Apr. 22, 1988, Pat. No. 4,866,560.

[51] Int. Cl.$^4$ ............................................. H02H 9/04
[52] U.S. Cl. ........................................ 361/56; 361/104; 361/111; 361/117; 361/127
[58] Field of Search ................. 361/58, 56, 9.1, 103, 361/104, 106, 111, 124–127; 340/638, 639, 644, 692, 635, 653; 307/116; 338/21

[56] References Cited

U.S. PATENT DOCUMENTS

| | | | |
|---|---|---|---|
| 3,987,343 | 10/1976 | Cunningham et al. | 361/127 X |
| 4,152,743 | 5/1979 | Comstock | 361/111 X |
| 4,335,415 | 6/1982 | Hooberry | 361/104 X |
| 4,439,806 | 3/1984 | Reitz | 361/56 X |
| 4,459,632 | 7/1984 | Nijman et al. | 361/124 X |
| 4,502,089 | 2/1985 | Ozawa et al. | 361/117 X |
| 4,587,588 | 5/1986 | Goldstein | 361/111 X |
| 4,689,597 | 8/1987 | Galloway et al. | 361/104 X |

Primary Examiner—Todd E. DeBoer
Attorney, Agent, or Firm—Charles A. McClure

[57] ABSTRACT

Electrical transient surge protection of electrical equipment downstream from a power source plus safeguarding of apparatus for providing such surge protection against failure at high currents or high temperature. Current-limiting and temperature-limiting fusible devices are used in conjunction with voltage-limiting devices, such as varistors, so as to protect watt-hour meters and downstream loads from electrical surges, and to safeguard such varistors from failure. Such apparatus may be located in such diverse places as a power line weatherhead, a watt-hour meter base, an adapter between a meter base and its normal mounting socket, or a circuit-breaker panel downstream of the meter and upstream of electrical loads metered thereby. The varistors are stacked in parallel circuit assemblies for heavy duty. Visible indicators of failure of the surge-protection are provided.

18 Claims, 3 Drawing Sheets

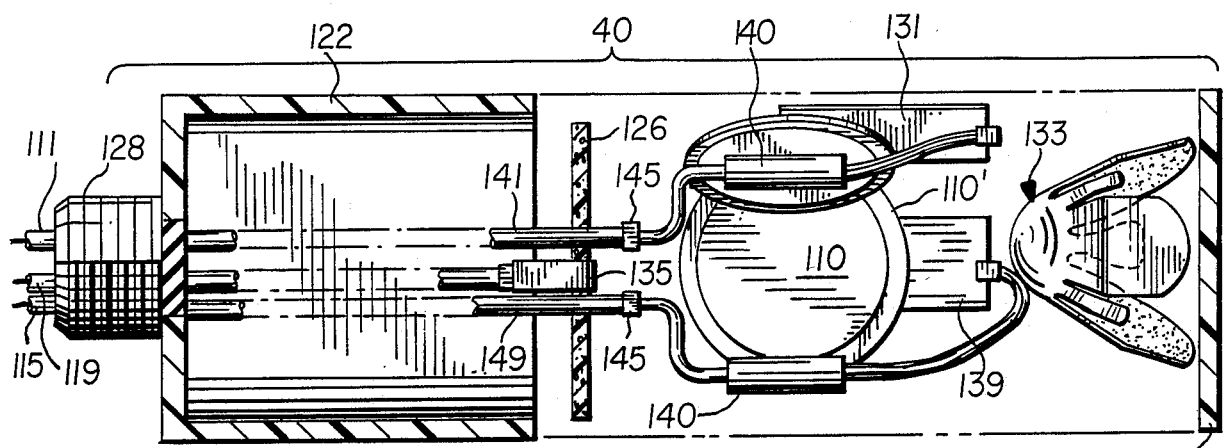
FIG. 4
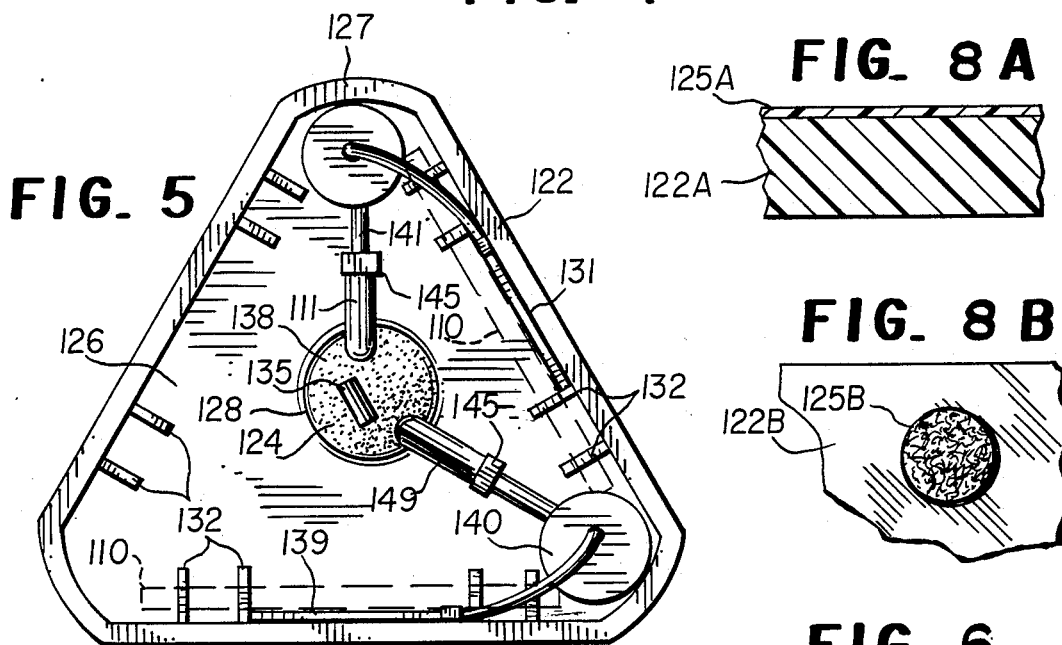
FIG. 5
FIG. 8 A
FIG. 8 B
FIG. 6
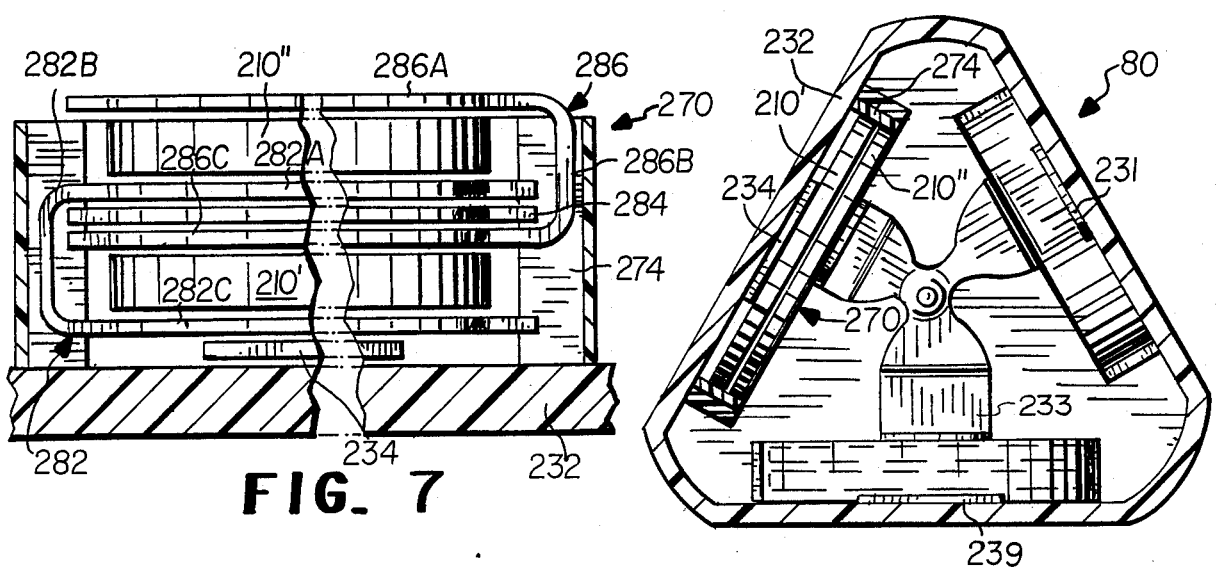
FIG. 7

PACKAGED ELECTRICAL TRANSIENT SURGE PROTECTION

This patent application is presented as a continuation-in-part of each of these prior copending patent applications listed here by serial numbers and filing dates and identified further hereinafter: Ser. No. 923,524 of 28 Oct. 1986; and Ser. No. 123,419 of 12 Jan. 1988; and Ser. No. 185,584 and Pat. No. 4,866,560, formerly Ser. No. 185,587 of 22 Apr. 1988. The contents of those applications are hereby incorporated herein.

FIELD OF THE INVENTION

This invention relates to packaged electrical transient surge protectors and especially physical modification thereof to improve their capability of protecting downstream electrical equipment from being damaged by surge currents in the tens of thousands of amperes.

BACKGROUND OF THE INVENTION

The present inventor has spearheaded the adoption of electrical transient surge protectors in plug-in adapters inserted between the usual watt-hour meter and its socket, as disclosed in his copending patent applications, Ser. No. 923,524 filed 28 Oct. 1986 for Electrical Transient Surge Protection, and Ser. No. 185,584 filed 22 Apr. 1988 for Electrical Transient Surge Protection in Meter Adapters. Surge protection may be installed instead (or in addition) at nearby upstream locations, such as a weatherhead, or downstream locations, such as a power panel, and may either be built-in or added thereto in prepackaged form. Applicant's disclosed embodiments of meter adapters utilize varistors or equivalent non-linear resistance means as components in their usual disklike form or partially prepackaged.

A common feature of packaged forms of surge protectors is lack or inadequacy of internal fusing. A metal oxide varistor can pass considerable surge current to ground and thereby protect downstream equipment, but repeated conduction of such surge currents increases the likelihood of failure in associated equipment or in the surge protection means itself if cooling time and paths are not present. Varistors may get so hot therefrom as to reach a characteristic failure temperature, resulting in loss of physical integrity—and perhaps explosively. Rather than rely upon installers to provide adequate fusing, it is preferable to include in the package one or more fuses especially selected to function optimally in such use.

The present inventor has pioneered in fusing varistors used for electrical transient surge protection, including distributed resistance fuse links in his first two noted patent applications. He also began the use of temperature-responsive or "thermal" fuses or similar cutoff devices in surge protection, as in the fourth of his aforementioned patent applications, for Safeguarding Electrical Transient Surge Protection.

The present inventor also has increased the current-carrying capacity of surge protectors in small housings by stacking varistor disks in parallel circuit therein, as in the third of his noted patent applications, entitled Electrical Transient Surge Protection.

SUMMARY OF THE INVENTION

In general, the objects of the present invention are attained, in apparatus for electrical transient surge protection utilizing over-voltage sensitive means, such as varistors, by one or more of these features: distributed resistance fuse linking, parallel stacking of varistors, and thermal fuse safeguarding of varistors. Various combinations of such over-current, over-voltage, and over-temperature protection are made possible, as set forth hereinafter.

More particularly, this invention is conveniently implemented in a housing of polygonal transverse section, such as a conventional hexagonal housing having alternating wide flat sides and relatively narrow arcuate sides, capped at one end, and having at its other end a hollow fitting through which leads go to external power and ground terminals. One or more disklike varistors against such flat sides have a face interconnected to such a power lead and an opposite face connected to such a ground lead.

A primary object of the present invention is to furnish a small housing with components adapted and interconnected to provide more comprehensive heavy duty electrical transient surge protection.

Another object of the invention is to supplement component varistors to enhance their capacity for treating large surge currents.

A further object is to protect component varistors so as to open the power circuit before varistors reach failure temperature.

Yet another object is to augment the current capacity of surge protection apparatus by stacking varistors in parallel circuit.

A still further object is to accomplish two or more of the foregoing objects simultaneously in a single compact container.

Other objects of the present invention, together with means and methods for attaining the various objects, will become apparent from the following descriptive text and the accompanying diagrams of several embodiments of the invention, all presented here by way of example rather than limitation.

SUMMARY OF THE DRAWINGS

FIG. 1A is an electrical schematic diagram of primitive fusing of electrical leads to a downstream location from an external power source;

FIG. 1B is a similar schematic with addition of primitive over-voltage means in the guise of spark gaps; and FIG. 1C is a similar schematic with the spark gaps replaced by modern variable-resistance over-voltage means, viz., varistors.

FIG. 4 is an exploded side elevation of a second embodiment of this invention, generally similar to (also different from) FIG. 1;

FIG. 5 is a plan view of the second embodiment less cover. analogous to FIG. 8 of the first embodiment;

FIG. 6 is a plan view of a housing of either of the foregoing embodiments with varistors stacked in parallel circuit therein;

FIG. 7 is a enlarged fragmentary sectional view of stacked varistors from FIG. 12; and FIGS. 8A and 8B are fragmentary sectional and elevational views of housings with added temperature-sensitive indicator means.

DETAILED DESCRIPTION

Figure 1A:
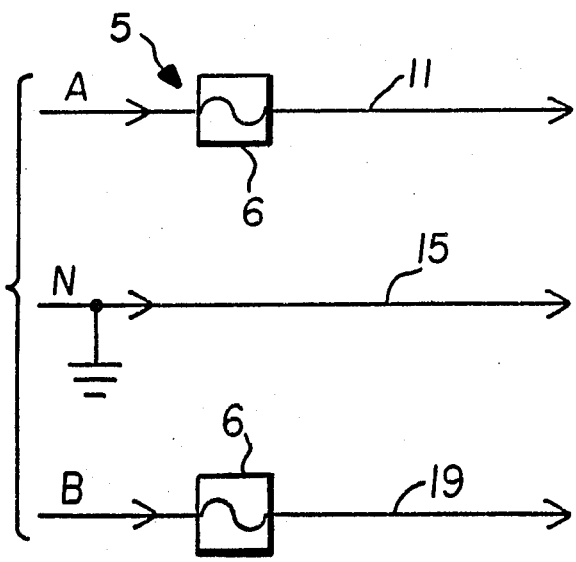
FIGS. 1A to 1C represent schematically electrical transient surge protection embodiments of the prior art.

FIG. 1A shows schematically an arrangement 5 of the prior art. At the left are power lines A, N, and B connecting (arrows at left) respectively to leads 11, 15, and 19 (FIGS. 1) and 111, 115, and 119 (FIG. 4) and to electrical load equipment downstream, not shown. Neutral line N is grounded; formerly it was often missing and/or combined with one of the other lines. Leads 11 and 19 from respective phase lines A and B contain conventionally concentrated or localized resistance fuses 6 (one each). Such an over-current device obstructs electrical current flow much as a constriction in a fluid conduit "bottle-necks" flow of fluid therethrough, absorbing energy from the flow in doing so, that an additional phase line (not shown) is to be added for three-phase power operation. An added phase line is provided with the same additional features as phase line A or B.

A conventional fuse melts and opens the circuit when current (averaged over a not-too-short and yet not-too-long period of time) occasions such an $I^2R$ energy transfer as to heat the fuse above its actuation (melting) temperature. Inasmuch as electrical transients are exceedingly brief even though extremely high in voltage, such a conventionally fused arrangement is virtually no protection from electrical surges until they arrive so frequently that the average current raises the temperature to melting temperature of the fuse.

Figure 1B:
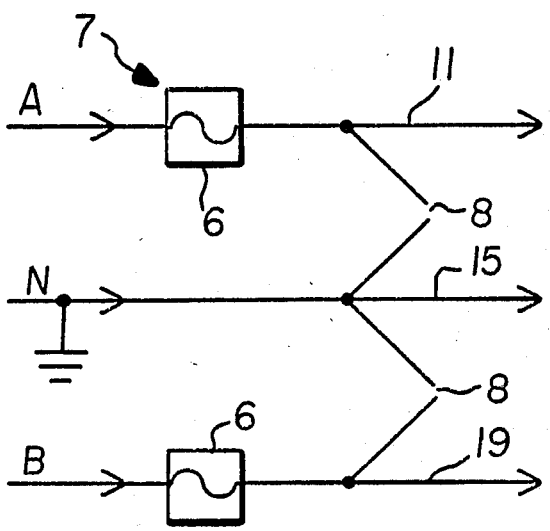
Figure 1C:
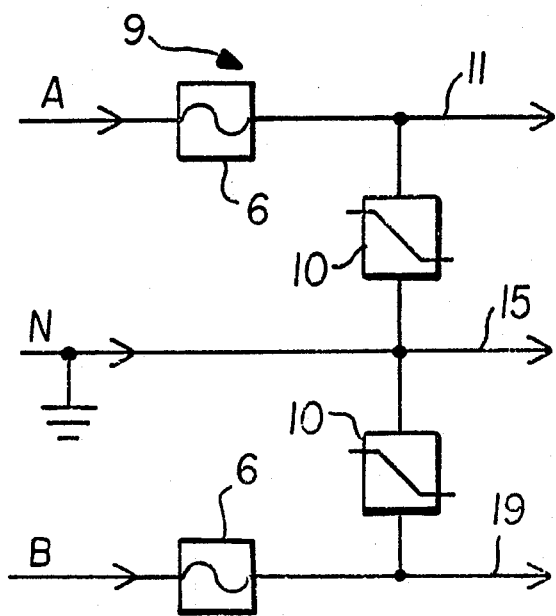

FIG. 1B shows similarly another arrangement 7 of the prior art, spark with gaps 8 to grounded lead 15 from each of phase leads 11 and 19. Such over-voltage means does not conduct at ordinary power voltages but only at considerably higher voltage, whereupon it does provides some surge protection. However, as both the breakdown and subsequent conduction voltages tend to vary with the atmospheric conditions as well as the condition of the spark gap, and as the arc temperature and by-product sparks are usually undesirable, such arrangement is of marginal benefit and has become obsolescent except on power line poles, towers, etc.

FIG. 2C shows more up-to-date arrangement of the prior art, in which the spark gaps have been replaced by varistors 10, sintered metal oxides in disklike or wafer form, which conduct very little at ordinary power voltages but conduct disproportionately well at higher voltages. Such an arrangement provides substantial protection for downstream equipment but not necessarily for the varistors, which may increase in temperature from frequency surges that average out less than the current tolerated by the conventional localized fuses. Varistors have characteristic failure temperatures at which their structural integrity is impaired, and they may suffer catastrophic destruction—which itself may damage equipment nearby and also may result in a fire even more broadly damaging.

This invention fuse links with resistance distributed substantially evenly therealong. A distributed resistance fuse link is of much lower resistance per unit length than a localized resistance fuse and is less likely to be in a housing, notwithstanding that it is indicated schematically here in a box. It is flexible and preferably has a flexible insulating cover of fabric or plastic film, so it can be bent to fit between terminals spaced closer together than its straight end-to-end length. Such a fuse link benefits surge protection equipment by the manifest facility with which it conducts surge currents, by its tolerance of extremely high currents experienced in transient surges, and also perhaps by other operating characteristics not hitherto recognized.

Also useful according to the present invention are over-temperature means. Although such a means often is actuated by melting at a given temperature and usually is called a "thermal" fuse or "thermal cutoff" device, it differs from over-current fuses in its ability to carry currents of such magnitude as may heat varistors or equivalent over-voltage means to destruction (preventable by melting of the thermal device at lower temperature).

Located in the near vicinity so as to approximate varistor temperature, such thermal device has as part of its conductive means a fusible mass (usually granules) having a characteristic melting point lower than the characteristic failure temperature of the varistor it is to protect. When such lower melting temperature is reached by the varistor and, hence, by the thermal cutoff device, the latter's fusible part melts, so that electrical conduction via the thermal device ceases, enabling the varistor to cool unharmed. As the thermal cutoff devices do not impede the current flow appreciably, they do not impair the enhancement of current flow provided by the action of the distributed resistance fuse links. Moreover, inasmuch as the temperature-sensitivity of the thermal cutoff means is not influenced by the current flow, the varistor protection provided thereby also is unimpaired.

Figure 2A:
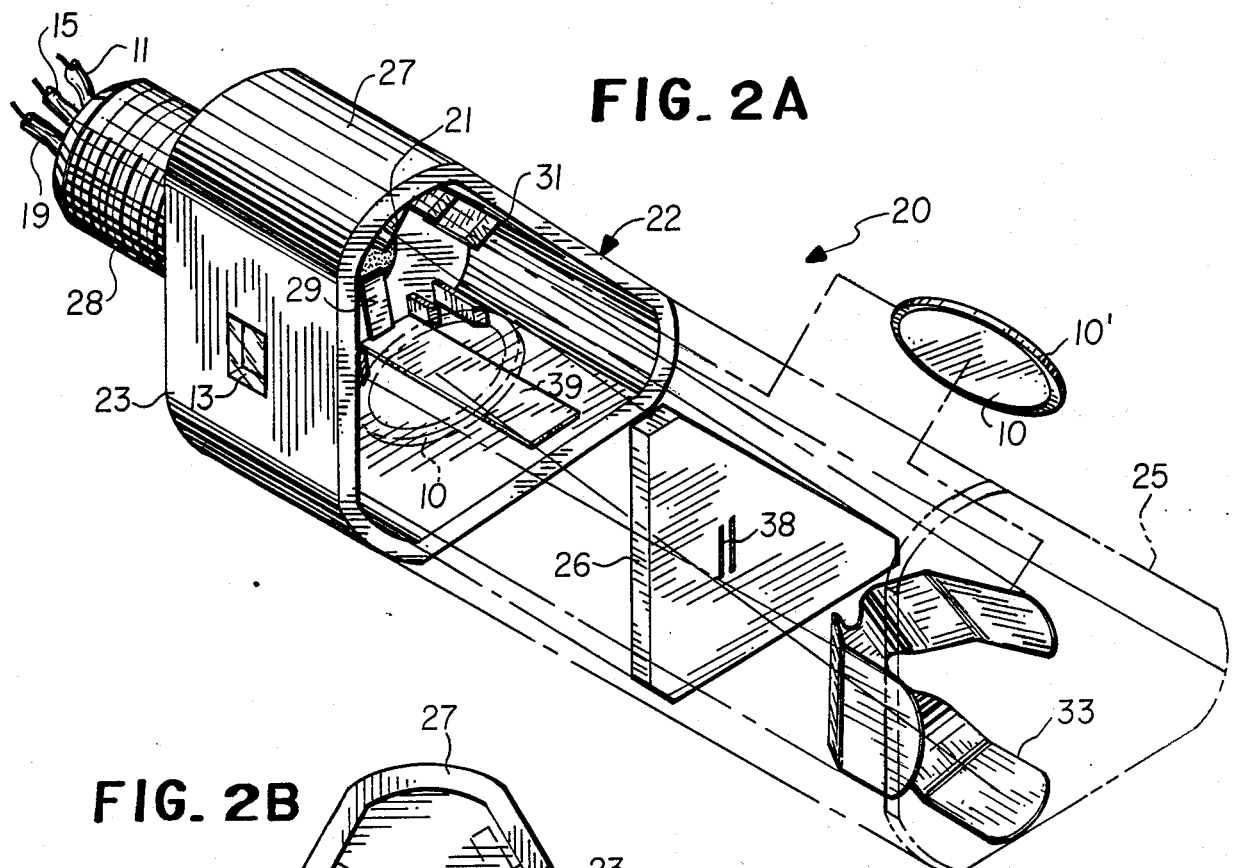
FIG. 2A is an exploded perspective view of a first embodiment of this invention.
Figure 2B:
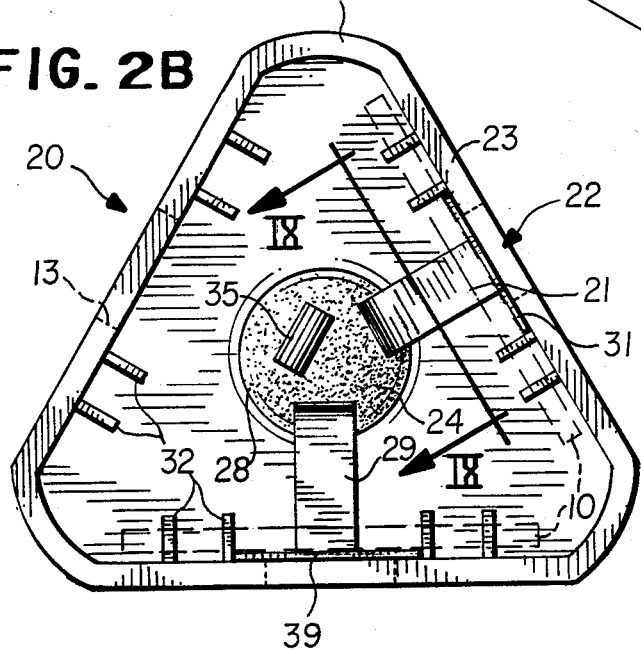
FIG. 2B is a plan view thereof less a housing cover.
Figure 3A:
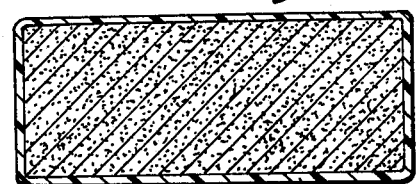
FIGS. 3A, 3B, and 3C are transverse sectional detail views of a distributed resistance fuse link of the foregoing views.
Figure 3B:
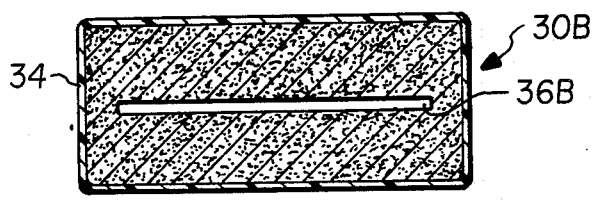
Figure 3C:
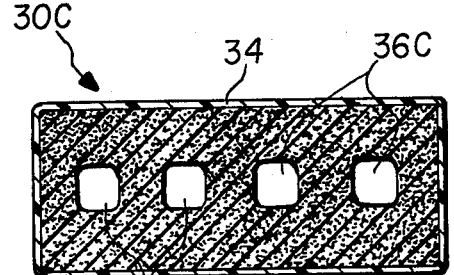

FIGS. 2A and 2B show embodiment 20 of electrical transient surge protection means of this invention. FIG. 2A is in perspective and partially exploded for clarity of assembly, whereas FIG. 2 is in plan, looking in on housing 22 and its contents before being closed off by cover 25. For convenience of description, the housing end closed by the mentioned cover is taken as the top (rather than as a side or the bottom) in accordance with the FIG. 2 orientation, notwithstanding that such end is lower than the opposite end (or bottom) in FIG. 2A.

Housing 22 has open-ended externally threaded fitting 28 at its far (bottom) end, through which pass electrical leads 11, 15, and 19 to an external power source (not visible here). The housing is polygonal in transverse cross-section and is more particularly substantially hexagonal, with three relatively wide flat sidewalls 23 (each with a translucent window 13 therein) alternating with a like number of relatively narrower arcuately curved sidewalls 27. Each flat sidewall is provided inside with two widely spaced pairs of closely spaced narrow bosses 32. The bosses nearer the center of the flat sidewall are shorter lengthwise than the flanking ones.

Visible within the internal end of the base or bottom fitting 28 are potting material 24 (electrically non-conductive, thermally conductive), short ground terminal 35, emerging from the potting material into and protruding through slot 38 in triangular disklike piece 26 of foamed insulation (when assembled), and an emergent pair of distributed resistance fuse links 21 and 29, which connect to pair of sidewall terminals 31 and 39, respectively. Pair of disklike varistors 10 (each with an insulating collar 10') rest edgewise upon the bosses inside the housing with one face against an adjacent terminal and, thus, in conductive contact (electrical and thermal) with such terminal.

During assembly, three-lobed resilient grounding insert 33 is compressed sufficiently to slide into the housing, where two of the lobes will contact the available face of the respective varistors opposite the face contiguous with the adjacent terminal. Then the cover is fitted onto the top of the housing and is sealed thereto in any suitable manner, as adhesively, by dielectric heating, etc.

FIGS. 9A, 9B, and 9C show in transverse cross-section, and greatly enlarged, alternative embodiments of distributed resistance fuse links 30A, 30B, and 30C according to this invention. Each fuse link has a thin covering 34 of insulation, which may be composed of fabric, plastic film, rubber, or the like. In order to transition to electrical contact with the terminals, the fuse links preferably have a rectangular section, as shown, although a round section is also acceptable. Fuse link 30A is shown as solid metal; fuse link 30B has hollow or slotted core 36B; and fuse link 30C has a series of spaced tubular openings 36C extending longitudinally therein.

FIG. 4 shows in elevation, and FIG. 5 in plan, embodiment 40 of this invention, in which features corresponding to features of the preceding embodiment are designated using reference numerals higher by one hundred than for the previously illustrated features and, thus, not necessarily mentioned in the following description. Leads 111 and 119 (partly cut away) connect to leads 141 and 149, shown round instead of flattened like the fuse links of the previous embodiment, and instead of connecting directly to terminals 131 and 139 connect instead to a pair of leads to thermal cutoff devices 140 via fittings 145. As shown most clearly in FIG. 5, each thermal fuse lies within one of curved sidewalls 127 between the outermost of bosses 132 on the flanking flat sidewalls of the housing. Leads from the opposite end of respective thermal fuses 140 connect to terminals 131 and 139 against which one face of varistors 110 rests. Lead 115 goes to the ground terminal as before. Shuttlecock-like resilient lobed grounding insert here has six lobes, with addition of three thermally conductive, electrically non-conductive lobes (stippled). Each added lobe is flanked by a pair of the original electrically (and also thermally) conductive lobes. The outer surface of the latter fully conductive lobes contacts the available face of the respective varistors—two in this embodiment, three in a similar three-phase embodiment—and the electrically non-conductive lobes contact the sides (electrically non-conductive) of the thermal fuse devices and aid in holding them in place. Heat from both of the varistors is transmitted to the thermal fuse devices via the intervening lobes of both types—and the body that supports them.

It will be apparent that, if leads 141 and 149 of FIGS. 5 and 6 were fuse links, embodiment 40 of those views and FIG. 5 would then become embodiment 60 of FIG. 6. Any of the embodiments shown in FIGS. 4 to 6 could be modified as shown in FIGS. 12 and 13, which show parallel stacking of varistors for enhanced current capacity.

FIG. 6 shows additional embodiment 80 in sectional plan with corresponding components numbered two hundred higher than in the first embodiment (20) and/or one hundred higher than in the second embodiment (40) or its variant 60. FIG. 7 is an elevation of an assembly 270 make up of components of this embodiment (80)—partly in section, and partly broken away. In place of single varistors of previous embodiments, here a pair of varistors are stacked in a parallel circuit relationship. For clarity of the showing, a narrow space separates adjacent components, it being understood that any two wide flat components so shown are actually contiguous as required for electrical conduction (or insulation). Each of the three flat sidewalls is shown with such a varistor stack, as for a three-phase surge protector to be subjected to very strong surges.

In FIG. 7 collar 271, from along any of sidewalls 232 of the housing in FIG. 12, surrounds a pair of varistors 210′ (nearer wall, bottom here) and 210″ (nearer interior, top here). The collar is recessed at its visible opposite extremities to accommodate bights 286B, 282B of a pair of interleaved laminar C-shaped connectors 286, 282 and their respective upper (286A, 282A) and lower (286C, 282C) arms protruding beyond the edge of the varistors—along with a pair of tabs protruding likewise from intermediate insulating lamina 284. As can be readily seen, upper 286 A and lower laminar arms 286C of connector 286 contact the upper faces of respective varistors 210″ and 210′ whereas upper 286A and lower laminar arms 286C of similar connector 286 contact the lower faces of the respective varistors. Insulating laminar disk 284 lies between upper arm 282A of lower connector 282 and lower arm 286C of upper connector 286.

It will be apparent that the normal varistor current-carrying capacity is effectively doubled by interconnecting two varistors in parallel. In particular, two 32 mm (diameter) varistors will have about half again the current capacity of one 40 mm varistor, for example, when in such a space-conserving interleaved arrangement.

Either the distributed fuse link or the thermal cutoff fuse (or both) of the previous embodiments may be used with the stacked varistors in like manner as with single varistors. Similarly any of such previously shown embodiments of this invention may be used in three-phase arrangements, whereas the stacked parallel varistors may be used in single-phase arrangements as well as in three-phase.

Whenever the distributed resistance fuse links are employed, a current overload sufficient to melt the fusible composition also burns the covering and coats the translucent housing window with soot, as can be confirmed at a glance, indicating that the surge protection is no longer functioning and that the unit should be removed for maintenance and/or be replaced by a fresh one. This seems preferably to making the entire housing translucent, which would necessitate cleaning or replacing the whole sooted housing.

FIGS. 8A and 8B illustrate two related alternatives to a translucent housing or housing window that are similarly useful in the event of a failed fuse link or other electrical component not otherwise evident, so long as the component failed from excessive temperature. In FIG. 8A, temperature-sensitive paint 125A coats any part of housing 122A that would be heated excessively by such a failure and is adapted to turn from its normal cool color, such as blue or green, to a hot color, such as orange or red. Paints with such characteristic are readily available commercially. FIG. 8B shows a variant of such paint in the form of adhesive dot 125B on the outside surface of housing wall 122B. After changing color such a dot can be removed and be replced by a fresh temperature-indicating dot if desired. One such is branded "Thermo Temp."

In other respects, the methods of operation of the several embodiments of this invention are self-evident from the foregoing descriptions and accompanying illustrations. In summary, the fuse links of embodiments 20 and 60, with their resistance distributed along their length instead of concentrated locally as in common fuses, connect from power lines through terminals to one face of the varistors and facilitate conduction of transient surges to the varistors, which clip the surge voltages and conduct the resulting currents to a path to an external ground. Nevertheless these fuse links are actuated by high average surge currents to interrupt the circuit for whatever degree of protection that may provide. Both of the foregoing modes of operation are obtained in embodiment 60. In embodiment 80, which is compatible with each of the foregoing, the total current capacity is increased by parallel stacking of varistors for each phase line, and three-phase operations—also compatible with the previous embodiments with provision of another incoming lead from a third power line—is also provided.

The components and materials used according to this invention are conventional in themselves and are readily available. Adequate housings may be made of many polymeric materials of suitably high degradation temperature. The illustrated housing is similar to one in which surge protection is provided by General Electric Co. (GE). Translucent windows may be made of methyl methacrylate, for example.

Varistors are available from well known sources, such as GE, McGraw-Edison, Panasonic, and Siemens. Varistors in this apparatus may usefully have a diameter of 32 mm, for example. A 40 mm diameter varistor provides about half again as much current-carrying capacity. In the specified parallel pack, two varistors of 32 mm diameter can provides about half again the current capacity of a single 40 mm.

Thermal cutoff circuit interrupters (using fusible elements) are available from Emerson Electric's Thermo-Disc division, also Nippon Electric Co. (NEC). In practice, the cutoff temperature should be selected a predetermined number of degrees below the characteristic failure temperature of the varistor(s) being used. Such safety margin depends in part upon how much the thermal device normally lags the varistor in rise of temperature—which depends on housing geometry and relative placement of varistor and thermal fuse. A suitable range therein for the illustrated apparatus is about fifty to one hundred degrees C., but with even better heat transfer it may be somewhat less, especially where varistor mass is great enough to limit the rate of varistor temperature rise.

Fuse links of distributed resistance type are available from Action Fuse, Bussman, and Littlefuse, for example. Composed of fusible material, such as an alloy principally of tin and lead, they may range from fractions of a millimeter to several mm. in diameter, and from several to a dozen or so centimeters in length, depending upon specific resistivity. Although transient surges are drastically different in amplitude and duration from conventional power line voltages and frequencies, as a rule of thumb such fuse links may be selected to correspond generally to a 30 ampere rating at normal power line potential. A length of about 5 cm. has been used in the illustrated apparatus. The regularity of resistance distribution along these fuses and the preferred use of Nicopress fittings in connecting them to other conductive components go far toward eliminating high-resistance bottle-necks of structure found in customary overcurrent fuses—conducive to premature failure.

Advantages and benefits of practicing this invention in its respective embodiments have been mentioned, and others may accrue to those persons who undertake to practice it. Variants have been suggested in this specification, and other modifications may be made, as by adding, combining, subdividing, or deleting parts or steps, while retaining at least some of the advantages and benefits of this invention—which itself is defined in the following claims.

I claim:

1. In a method of preventing transient electrical surges received in a circuit from an upstream power source from proceeding downstream, including bypassing associated surge currents to ground via voltage-limiting varistor means including a plurality of varistors, the improvement comprising stacking a pair of the varistors and connecting them in parallel by interleaving them with laminar connectors, providing the circuit to the varistor means with a current-limiting conductive fusible component at least several centimeters long having electrical resistance distributed substantially evenly along its length, and providing the same circuit with a temperature-limiting conductive fusible component responsive to the temperature of the varistor means.

2. Surge-protection method according to claim 1, including the step of confining the mentioned varistors within a housing having at least one sidewall and also the step of confining the same varistors laterally together within collar means adjacent the sidewall.

3. Surge-protection method according to claim 2, wherein the housing has a translucent window thereinto, and including the step of indicating by the degree of translucency of the window whether any internal component had smoked, as by failure of a fuse component.

4. Surge-protection method according to claim 2, including the step of indicating by the appearance of temperature-sensitive means adjacent the outside of the sidewall whether the circuit had been interrupted by smoking of a component inside the housing.

5. In apparatus preventing transient electrical surges in a circuit from an upstream power source from proceeding downstream, including voltage-limiting varistor means bypassing associated surge currents to ground, the improvement comprising in the circuit from the power source to the varistor means, current-limiting distributed resistance fuse link means, and temperature-limiting fusible thermal cutoff means responsive to the temperature of the varistor means and adapted to open the circuit at a temperature below temperatures intolerable to the varistor means, wherein the varistor means includes a plurality of stacked varistors connected in parallel circuit by interleaving them with laminar connectors.

6. Surge-protective apparatus according to claim 5, including collar means confining the stacked varistors laterally together.

7. Surge-protective apparatus according to claim 6, wherein the housing has a translucent window thereinto adapted to indicate by its current degree of translucency whether any internal component has smoked, as by failure of a fuse component.

8. Surge-protective apparatus according to claim 6, including temperature-sensitive means adjacent the outside of the sidewall and adapted to indicate whether the circuit has been interrupted by smoking of a component inside the housing.

9. Packaged means to protect downstream electrical equipment from transient electrical surges from an external power source with a plurality of power lines, comprising a housing polygonal in plan, accommodating leads between its interior and the exterior at one end, and covered with a cap at the opposite end, containing therein
- a plurality of disklike varistors as over-voltage conductors,
- a plurality of terminal means along housing sidewalls flanked individually by a pair of sidewalls lacking such means,
- each such varistor having one of its faces in conductive contact with such sidewall terminal means and its opposite face in conductive contact with grounding means, and
- thermal cutoff means
  - adjacent a sidewall other than a sidewall having a sidewall terminal means thereadjacent, and
  - interconnected in circuit between such a power source and such sidewall terminal means.

10. Surge-protection means according to claim 9, wherein the ground terminal means comprising one lobe of a conductive resilient multi-lobed member fitting snugly within the housing with each lobe thereof flexed resiliently by contact with a sidewall or with means intervening between lobe and sidewall.

11. Surge-protection means according to claim 9, wherein the housing is substantially hexagonal.

12. Surge-protection means according to claim 11, wherein the sidewalls, in sequence around the housing periphery, are alternately wider and narrower than the equilateral width of such number of sides.

13. Surge-protection means according to claim 9, including a distributed resistance fuse link interconnected in circuit between such a power source and such a sidewall terminal means.

14. Surge-protection means according to claim 13, wherein such distributed resistance fuse link is connected to the terminal means within the one end of the housing and extends throughout toward the exterior.

15. Surge-protection means according to claim 9, wherein the thermal cutoff means is connected at its lower end to a power line lead and at its upper end to the upper end of adjacent sidewall terminal means not otherwise connected to a power line lead.

16. Packaged means to protect downstream electrical equipment from transient electrical surges from an external power source with a plurality of power lines, comprising a housing polygonal in plan, accommodating leads between its interior and the exterior at one end, and covered with a cap at the opposite end, containing therein:
- a pair of disklike varistors as over-voltage conductors stacked along each sidewall with any varistor thereadjacent and connected in parallel circuit by a pair of conductive laminar means interleaved therewith,
- terminal means along housing sidewalls flanked individually by a pair of sidewalls lacking such means,
- each such varistor having one of its faces in conductive contact with such sidewall terminal means, and its opposite face in conductive contact with grounding means.

17. Surge-protection means according to claim 16, including thermal cutoff means interconnected in circuit between such a power source and such sidewall terminal means.

18. Surge-protection means according to claim 16, wherein each such interleaved conductive laminar means has a C-shaped transverse configuration, with the first laminar means having its respective arms in contact with respective first faces of the respective varistors, with the second laminar means having its respective arms in contact with second faces of the respective varistors, and laminar insulator means between and spacing apart the first arm of the second laminar means and the second arm of the first laminar means.

* * * * *